United States Patent [19]

Miyata

[11] Patent Number: 4,470,686

[45] Date of Patent: Sep. 11, 1984

[54] DISTANCE AND LIGHT MEASURING DEVICE FOR SINGLE LENS REFLEX CAMERA

[75] Inventor: Katsuhiko Miyata, Tokyo, Japan

[73] Assignee: Asahi Kogaku Kogyo Kabushiki Kaisha, Tokyo, Japan

[21] Appl. No.: 483,304

[22] Filed: Apr. 8, 1983

[30] Foreign Application Priority Data

Apr. 12, 1982 [JP] Japan .................................. 57/60684

[51] Int. Cl.³ .......................................... G03B 7/099
[52] U.S. Cl. ...................................... 354/429; 354/479
[58] Field of Search ............................... 354/429, 479

[56] References Cited

U.S. PATENT DOCUMENTS 4,172,643 10/1979 Schulz et al. ..................... 354/479

Primary Examiner—Michael L. Gellner

Attorney, Agent, or Firm—Sughrue, Mion, Zinn, Macpeak and Seas

[57] ABSTRACT

A device for measuring distance and light in a single lens reflex camera includes first and second mirrors, a distance measuring element, and a light measuring element which are disposed on a mirror box. The second mirror extends obliquely from a rear side of the first mirror, and the second mirror has first and second surfaces which form different angles with the first mirror. The first surface is translucent so that light is reflected from and transmitted through it, while the second surface reflects the light which is transmitted through the first surface. The first surface reflects light towards a distance measuring element, while the second surface reflects light towards a light measuring element so that the mechanical arrangement of the distance and light measuring device is simplified.

6 Claims, 4 Drawing Figures

DISTANCE AND LIGHT MEASURING DEVICE FOR SINGLE LENS REFLEX CAMERA

BACKGROUND OF THE INVENTION

1. Field of the Invention

The present invention relates to a distance and light measuring device for a single lens reflex camera.

2. Description of the Prior Art

Most recent single lens reflex cameras have photometers (or light measuring devices) such as TTL exposure meters or TTL automatic controllers for achieving exposure control. A light measuring device of some type is generally essential for any camera.

A variety of TTL automatic control systems are available, and these systems can be divided into two groups. In the first group, the quantity of light from an object to be photographed is controlled through an arithmetic operation after being stored in the system. In the second group, the arithmetic operation is carried out while exposure is performed. A variety of light measuring elements and light measuring optical systems, which are required for controlling the first group, have been proposed, and there is a relatively large degree of freedom in selecting the installation position of the light measuring elements and optical systems. In the second group, it is necessary to measure light which is reflected from the shutter top curtain surface or the film surface. Accordingly, the light measuring element must be positioned in the periphery of the mirror box, and the light measuring element is typically positioned on the bottom of the mirror box.

In addition, the automatic control of a strobe is carried out by a light measuring element which is disposed on the bottom of the mirror box, thus forming a TTL auto strobe.

As is apparent from the above description, in order to achieve exposure control for a single lens reflex camera, installation of the light measuring element on the bottom of the mirror box is considerably important.

On the other hand, not only is the exposure control of the single lens reflex camera automated, the focus detection is also often automated or carried out electrically. Therefore, in such cameras, a focusing indicating device or an automatic focusing device is built into the single lens reflex camera. In the case of a TTL focusing device, its detecting element is, in general, arranged in the camera body. In addition, the best method of setting the detecting element of the focusing device in the camera body without decreasing or lowering the functions and performance of the single lens reflex camera is to arrange it on the bottom of the mirror box.

As the automation, electrical circuitry or system of a single lens reflex camera is improved, the number of sensors is increased. Accordingly, the positions at which these sensors are installed provide other problems.

SUMMARY OF THE INVENTION

An object of the present invention is to provide a device with which the sensor for exposure control and the sensor for automatic focusing can be set on the bottom of the mirror box and can be combined neatly in a single optical system.

In accordance with the present invention, a device for measuring light and distance in a single lens reflex camera includes a mirror box, a first mirror which has a translucent central portion, a second mirror which extends obliquely from a rear side of the first mirror, a distance measuring element and a light measuring element disposed on the mirror box. The second mirror has a first translucent surface for reflecting and transmitting light, as well as a second reflecting surface, and the first and second surfaces form different angles with the first mirror so that light passing through the translucent central portion of the first mirror is reflected onto both the distance measuring element and the light measuring element.

DESCRIPTION OF THE PREFERRED EMBODIMENTS

Figure 1:
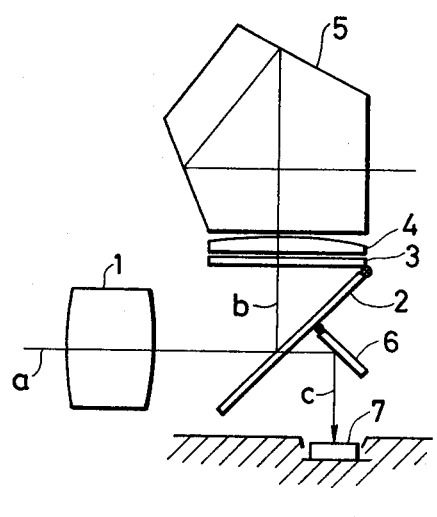
FIG. 1 is a schematic, sectional diagram showing a conventional distance measuring optical system.

FIG. 1 shows a conventional, prior art finder optical system for a focusing device in a single-lens reflex camera. As is well known in the art, a part b of a light beam a passes through a lens 1, is reflected by a mirror 2, and is advanced through a Fresnel lens 3, a condenser lens 4 and a penta prism 5, thus forming a finder field-of-vision system. On the other hand, a part c of the light beam a passes through a central translucent portion of the mirror 2 and is reflected by a distance metering mirror 6. The distance measuring mirror 6 is relatively small and extends obliquely from a rear side of the mirror 2. Thus, the part c of the light is transported to a distance measuring element 7 which is provided on the bottom of a mirror box.

Figure 2:
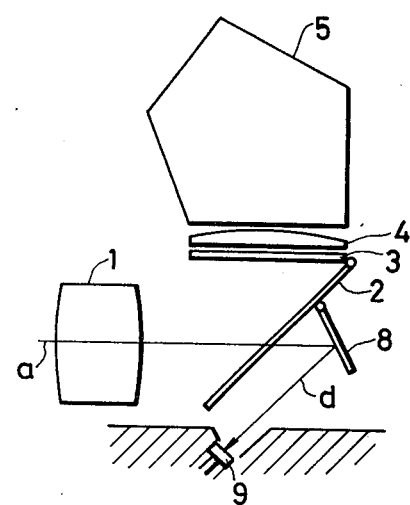
FIG. 2 is a schematic, sectional diagram showing a conventional light measuring optical system.

FIG. 2 shows a conventional, finder optical system for a light measuring device. Components in FIG. 2 which are identical to ones shown in FIG. 1 are numbered similarly. The part a of the light, which has passed through the mirror 2, is reflected by a small, light measuring mirror 8 which extends obliquely from the rear side of the mirror 2. The part a of the light is then transported to a light measuring element 9 which is disposed obliquely on the bottom of the mirror box so that it faces a film surface. The light measuring element 9 is obliquely set in order to obtain data from the film surface or the shutter curtain surface when the mirror 2 is lifted.

Figure 3:
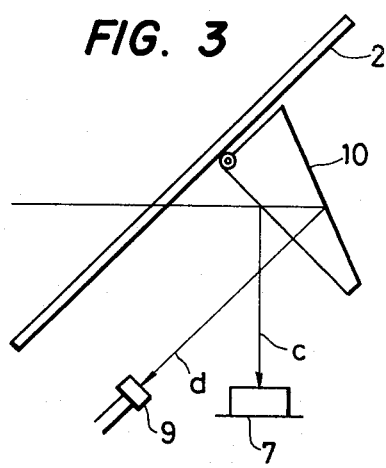
FIG. 3 is a schematic, sectional diagram showing one embodiment of the invention in which the distance measuring system and the light measuring system are combined.

FIG. 3 is a schematic, sectional view showing one embodiment of the present invention. Instead of the small mirror 6 or 8 in FIGS. 1 and 2, a prism-like mirror block 10 is provided on the rear side of the mirror 2. The mirror block 10 has a first surface which is translucent and a second surface which is reflective. The angle formed between the second surface and mirror 2 is different from that formed between the first surface and the mirror 2. The first surface is used as a beam splitter, and the angle of the first surface is selected so that the light c which is reflected from it is applied to a distance measuring element 7 which is disposed on the bottom of the mirror box. The angle of the second surface is selected so that the light d, which is reflected from the second surface, enters a light measuring element 9 which is adapted to receive reflection light from the film surface or the shutter curtain surface when the mirror 2 is lifted. Accordingly, the light measuring element 9 is arranged in the front portion of the bottom of the mirror box.

The distance measuring element and the light measuring element can be satisfactorily disposed on the bottom of the mirror box as described above. Accordingly, the two functions of these elements can be combined together merely by providing the mirror 10 with first and second surfaces which form different angles with the mirror 2.

Figure 4:
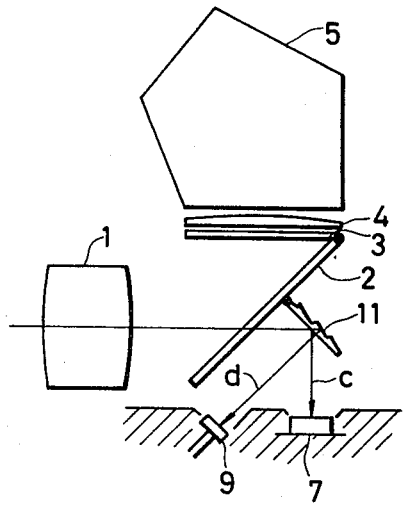
FIG. 4 is a schematic, sectional diagram showing another embodiment of the invention.

FIG. 4 shows another embodiment of the present invention. In the FIG. 4 embodiment, the above-described mirror block 10 is modified into a Fresnel's compound mirror 11.

The first surface of the compound mirror 11 should reflect light accurately, and it should be made of glass because it is used for focusing. The second surface, which is the Fresnel's reflecting surface, may be made of plastic because it is used for light measurement. Accordingly, the second surface may have a somewhat variable reflective accuracy. The compound mirror 11 can be fabricated by bonding a Fresnel's plastic member to the first surface which is made of glass. By employing this method, the compound mirror 11 can be made smaller in size than the mirror block 10.

As is apparent from the above description, a part of the light beam which has passed through the lens 1 is allowed to pass through the mirror 2. The part of the light beam which has passed through the mirror 2 is split into the light c, which is reflected by the first surface of the mirror block 10 or the compound mirror 11, and the light d which is reflected by the second surface. The reflected lights c and d are applied to the distance measuring element 7 and the light measuring element 9, respectively.

According to the present invention, the distance measuring optical system and the light measuring optical system can be combined neatly and simply. Therefore, the invention provides a distance measuring optical system and a light measuring optical system for a single lens reflex camera which is high in reliability because the mechanical arrangement is simplified.

I claim:

1. A device for measuring distance and light in a single lens reflex camera, comprising:
    a mirror box;
    a first mirror having a translucent central portion;
    a second mirror extending obliquely from a rear side of said first mirror;
    a distance measuring element and a light measuring element disposed on said mirror box;
    said second mirror having a first translucent surface for reflecting and transmitting light, and a second reflecting surface, said first and second surfaces forming different angles with said first mirror.

2. The device as claimed in claim 1 wherein said second mirror comprises a Fresnel compound mirror.

3. The device as claimed in claim 2 wherein said Fresnel compound mirror comprises a first translucent glass surface which is bonded to a Fresnel plastic reflective second surface.

4. The device as claimed in claim 1 wherein said second mirror comprises a prism-like mirror block.

5. The device as claimed in claim 1 wherein said light measuring element is disposed in a front portion of a bottom of said mirror box.

6. The device as claimed in claim 1 wherein said distance measuring element and said light measuring element are spaced apart from one another on said mirror box, said first surface reflecting part of a light beam passing through said translucent central portion of said first mirror toward said distance measuring element and allowing a remaining part of said light beam to pass through said first surface and be reflected from said second surface, said remaining part of said light beam being reflected by said second surface towards said light measuring element.

* * * * *